United States Patent
Guo

(10) Patent No.: US 12,368,949 B2
(45) Date of Patent: Jul. 22, 2025

(54) PHOTOGRAPHING METHOD AND APPARATUS, ELECTRONIC DEVICE AND READABLE STORAGE MEDIUM

(71) Applicant: VIVO MOBILE COMMUNICATION CO., LTD., Guangdong (CN)

(72) Inventor: Yue Guo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 97 days.

(21) Appl. No.: 18/356,534

(22) Filed: Jul. 21, 2023

(65) Prior Publication Data
US 2023/0362477 A1 Nov. 9, 2023

Related U.S. Application Data

(63) Continuation of application No. PCT/CN2022/072523, filed on Jan. 18, 2022.

(30) Foreign Application Priority Data

Jan. 22, 2021 (CN) .......................... 202110087293.1

(51) Int. Cl.
*H04N 23/63* (2023.01)

(52) U.S. Cl.
CPC ......... *H04N 23/632* (2023.01); *H04N 23/633* (2023.01)

(58) Field of Classification Search
CPC .. H04N 23/632; H04N 23/633; H04N 5/2621; H04N 5/272; H04N 5/772; H04N 23/45; H04N 23/61; H04N 23/667
See application file for complete search history.

(56) References Cited

U.S. PATENT DOCUMENTS

| 2010/0302409 A1 | 12/2010 | Matas et al. |
| 2015/0187056 A1 | 7/2015 | Nakamae et al. |

(Continued)

FOREIGN PATENT DOCUMENTS

| CN | 106909274 A | 6/2017 |
| CN | 108471498 A | 8/2018 |

(Continued)

OTHER PUBLICATIONS

First Office Action for Chinese Application No. 202110087293.1, dated Nov. 2, 2021, 7 Pages.

(Continued)

*Primary Examiner* — Mekonnen D Dagnew
(74) *Attorney, Agent, or Firm* — BROOKS KUSHMAN P.C.

(57) ABSTRACT

A photographing method and apparatus, an electronic device and a readable storage medium. The method includes: receiving a first input performed by a user, the first input being used for adjusting the display state of a first object in a first preview image, and the first preview image being an image captured by a first camera; in response to the first input, displaying a second preview image, the second preview image being obtained by processing an image captured by a main camera, and the second preview image including the first object whose display state has changed; and performing, according to display information of the second preview image, image processing on N images captured by N cameras to obtain a first target image, where the N cameras at least include the main camera, and N is a positive integer.

14 Claims, 9 Drawing Sheets

(56) References Cited

U.S. PATENT DOCUMENTS

| | | | |
|---|---|---|---|
| 2017/0064206 A1* | 3/2017 | Ku | H04N 5/2621 |
| 2019/0082101 A1 | 3/2019 | Baldwin et al. | |
| 2020/0099856 A1 | 3/2020 | Yun et al. | |
| 2020/0128181 A1* | 4/2020 | An | G06T 7/20 |
| 2020/0145583 A1* | 5/2020 | Shanmugam | G06V 10/764 |
| 2021/0168300 A1 | 6/2021 | Wang et al. | |

FOREIGN PATENT DOCUMENTS

| | | |
|---|---|---|
| CN | 109729266 A | 5/2019 |
| CN | 109743498 A | 5/2019 |
| CN | 110445978 A | 11/2019 |
| CN | 111669506 A | 9/2020 |
| CN | 111988522 A | 11/2020 |
| CN | 112911059 A | 6/2021 |
| EP | 2637397 A1 | 9/2013 |
| EP | 3136705 A2 | 3/2017 |
| JP | 2015126326 A | 7/2015 |

OTHER PUBLICATIONS

International Search Report and Written Opinion for Application No. PCT /CN2022/072523, dated Apr. 13, 2022, 9 Pages.
Extended European Search Report for Application No. 22742151.8, dated Jun. 4, 2024, 10 Pages.
First Office Action for Japanese Application No. 2023-544407, dated Sep. 20, 2024, 5 Pages.

* cited by examiner

PHOTOGRAPHING METHOD AND APPARATUS, ELECTRONIC DEVICE AND READABLE STORAGE MEDIUM

CROSS-REFERENCE TO RELATED APPLICATIONS

This application is a continuation of PCT International Application No. PCT/CN2022/072523 filed on Jan. 18, 2022, which claims priority to Chinese Patent Application No. 202110087293.1 filed on Jan. 22, 2021, which are incorporated herein by reference in their entireties.

TECHNICAL FIELD

This application relates to the technical field of image processing, in particular to a photographing method and apparatus, an electronic device and a readable storage medium.

BACKGROUND

With the development of a photographing function of an electronic device, more and more users use electronic devices for photographing to keep a record for their daily lives. At present, imaging of the electronic device is an image captured by a camera, that is, imaging is consistent with an actual scenery. Apparently, an imaging mode in the prior art is single.

SUMMARY

Embodiments of this application aim to provide a photographing method and apparatus, an electronic device and a readable storage medium.

In a first aspect, an embodiment of this application provides a photographing method, including:
receiving a first input performed by a user, the first input being used for adjusting a display state of a first object in a first preview image, and the first preview image being an image captured by a first camera;
displaying a second preview image in response to the first input, the second preview image being obtained by processing an image captured by a main camera, and the second preview image including the first object whose display state has changed; and
performing, according to display information of the second preview image, image processing on N images captured by N cameras to obtain a first target image;
the N cameras at least including the main camera, and N being a positive integer.

In a second aspect, an embodiment of this application provides a photographing apparatus, including:
a first receiving module, configured to receive a first input performed by a user, the first input being used for adjusting a display state of a first object in a first preview image, and the first preview image being an image captured by a first camera;
a first display module, configured to display a second preview image in response to the first input, the second preview image being obtained by processing an image captured by a main camera, and the second preview image including the first object whose display state has changed; and
a first processing module, configured to perform, according to display information of the second preview image, image processing on N images captured by N cameras to obtain a first target image;
the N cameras at least including the main camera, and N being a positive integer.

In a third aspect, an embodiment of this application provides an electronic device, including a processor, a memory, and a program or an instruction stored on the memory and capable of running on the processor, the program or the instruction, when executed by the processor, implementing steps of the method as described in the first aspect.

In a fourth aspect, an embodiment of this application provides a readable storage medium, storing a program or an instruction, the program or the instruction, when executed by a processor, implementing steps of the method as described in the first aspect.

In a fifth aspect, an embodiment of this application provides a chip, the chip including a processor and a communication interface, the communication interface being coupled to the processor, and the processor being configured to run a program or an instruction to implement the method as described in the first aspect.

In a sixth aspect, an embodiment of this application provides a computer program product, stored in a non-volatile storage medium, the computer program product being executed by at least one processor to implement steps of the method as described in the first aspect.

DETAILED DESCRIPTION

Figure 1:
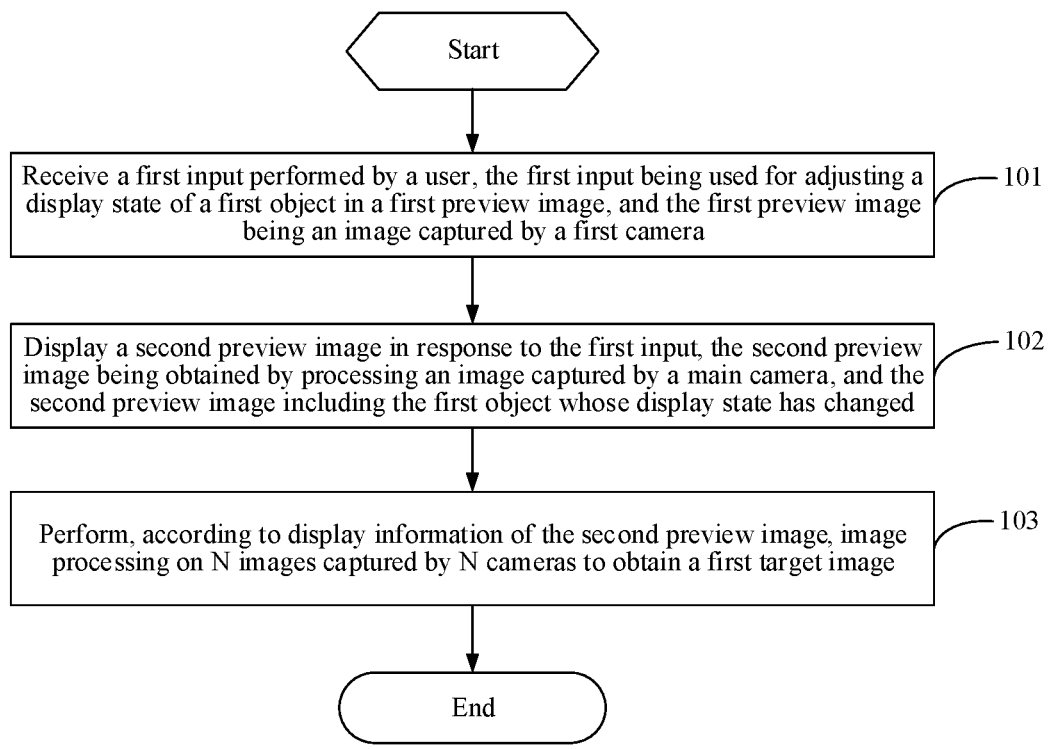
FIG. 1 is a flowchart of a photographing method provided by an embodiment of this application.

The technical solutions in embodiments of this application are clearly described below with reference to the accompanying drawings in the embodiments of this application. Apparently, the described embodiments are some rather than all of the embodiments of this application. All other embodiments obtained by those ordinarily skilled in the art based on the embodiments of this application without making creative efforts shall fall within the protection scope of this application.

In the specification and claims of this application, terms such as "first" and "second" are used to distinguish similar objects, but are not used to describe a specific sequence or precedence order. It is to be understood that data used in this way are exchangeable in a proper case, so that the embodiments of this application can be implemented in an order apart from those sequences illustrated or described herein. Objects distinguished by "first", "second" or the like are usually of the same kind, but the number of the objects is not limited, for example, there may be one or more first objects. In addition, "and/or" in this specification and the claims represents at least one of the connected objects, and a character "/" generally represents an "or" relationship between associated objects before and after the character.

A photographing method provided by an embodiment of this application is described in detail below through a specific embodiment and its application scene with reference to the accompanying drawings.

The photographing method provided by the embodiment of this application may be executed by an electronic device including at least one camera.

In a case that the electronic device includes two or more than two cameras, different cameras may have different focusing ranges (or called a zoom ratio), so as to clearly photograph objects in different distances.

It may be understood that different focusing ranges correspond to different object distance photographing ranges. Therefore, during specific implementation, the electronic device may select, based on an object distance of a target object, a camera which photographs the target object. An object distance photographing range corresponding to a focusing range of the camera which photographs the target object includes the object distance of the target object.

For example, it is assumed that the electronic device includes a standard camera, an ultra wide camera and a long-focus camera, a focusing range of the ultra wide camera is a first focusing range and suitable for photographing an object with an object distance being greater than or equal to 0 and smaller than a first preset distance threshold, that is, an object distance photographing range corresponding to the first focusing range is [0, first preset distance threshold). A focusing range of the standard camera is a second focusing range and suitable for photographing an object with an object distance being greater than or equal to the first preset distance threshold and smaller than a second preset distance threshold, that is, an object distance photographing range corresponding to the second focusing range is [first preset distance threshold, second preset distance threshold). A focusing range of the long-focus camera is a third focusing range and suitable for photographing an object with an object distance being greater than or equal to the second preset distance threshold, that is, an object distance photographing range corresponding to the second focusing range is [second preset distance threshold, ∞).

If the object distance of the to-be-photographed target object is smaller than the first preset distance threshold, the electronic device may select the ultra wide camera to photograph the target object.

Besides, in a case that the electronic device includes two or more than two cameras, one of the cameras may be selected as a main camera of the electronic device, the other camera may be set as an auxiliary camera of the electronic device, and setting of the main camera and the auxiliary camera may be determined according to actual demands, which is not limited in this embodiment of this application. For example, it is assumed that the electronic device includes the above standard camera, the ultra wide camera and the long-focus camera, the standard camera may be used as the main camera of the electronic device, and the ultra wide camera and the long-focus camera may be used as the auxiliary cameras of the electronic device.

In actual application, the electronic device may be a mobile phone, a tablet personal computer (Tablet Personal Computer), a laptop computer (Laptop Computer) which is called a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device), or vehicle user equipment (VUE), or pedestrian user equipment (PUE) or the like.

Referring to FIG. 1, which is a first flowchart of a photographing method provided by an embodiment of this application. As shown in FIG. 1, the photographing method may include the following steps.

Step 101: a first input performed by a user is received, the first input being used for adjusting a display state of a first object in a first preview image, and the first preview image being an image captured by a first camera.

Adjusting the display state of the first object in the first preview image may include at least one of the following:
  adjusting a display size of the first object in the first preview image, for example, the first object in the first preview image is magnified or minified; or
  adjusting a display position of the first object in the first preview image, for example, the first object in the first preview image is moved upwards, downwards, leftwards or rightwards.

The first camera may be a main camera or an auxiliary camera of the electronic device.

Step 102: a second preview image is displayed in response to the first input, the second preview image being obtained by processing an image captured by the main camera, and the second preview image including the first object whose display state has changed.

During specific implementation, displaying the second preview image in response to the first input may include:
  adjusting a display state of the first preview image in response to the first input, or adjusting the display state of the first object of the first preview image to obtain a first processing image;
  performing fourth image processing on the first processing image to obtain a fourth intermediate image, the fourth intermediate image only including fourth pixel information in the first processing image, and the fourth pixel information being pixel information corresponding to the first object in the first processing image;
  obtaining a fourth image, the fourth image being an image captured by the main camera at a second moment;

performing fifth image processing on the fourth image to obtain a fifth intermediate image, the fifth intermediate image including all pixel information in the fourth image except for fifth pixel information, and the fifth pixel information being pixel information corresponding to the first object in the fourth image;

compositing the fourth intermediate image and the fifth intermediate image to obtain the second preview image; and displaying the second preview image; where the second moment is a moment earlier than an input moment of the first input, or the second moment is a moment later than the input moment of the first input.

Further, in a case that the second moment is earlier than the input moment of the first input, the fourth image may be an image captured by the main camera from a queue tail of a buffer queue corresponding thereto; and in a case that the second moment is later than the input moment of the first input, the fourth image may be an image outputted after photosensitizing of a sensor of the main camera.

In this optional implementation, in a first implementation, the first input may implement adjustment of the display state of the first object in the first preview image by adjusting the display state of the whole first preview image. In this implementation, the first processing image is the first preview image after the display state is adjusted, that is, all objects in the first processing image change compared with those of the first preview image.

In a second implementation, the first input may only adjust the display state of the first object in the first preview image, which may not affect the display state of other objects in the first preview image. In this implementation, only the first object in the first processing image changes compared with that of the first preview image, and the other objects do not change compared with those of the first preview image.

After obtaining the first processing image, the electronic device may obtain the fourth intermediate image deleting all pixel information in the first processing image except for the fourth pixel information.

Besides, the electronic device may obtain the fourth image and obtains the fifth intermediate image by deleting the fifth pixel information in the fourth image.

After the fourth intermediate image and the fifth intermediate image are obtained, the electronic device may composite the fourth intermediate image and the fifth intermediate image to obtain the second preview image.

Afterwards, the electronic device may display the second preview image, so that a user checks, through the second preview image, the first object whose display state has changed.

It needs to be noted that in a case that a blank area exists in the second preview image, before displaying the second preview image, the electronic device may but not limited to using an interpolation processing mode to perform pixel filling on the blank area in the second preview image by adopting adjacent pixel information of the blank area so as to improve an imaging effect.

For ease of understanding, example descriptions are provided below with reference to FIG. 2a to FIG. 2e.

In the following example, it is assumed that an image captured by each camera includes two objects of "cloud" and "people", "cloud" is regarded as the first object, and "people" is regarded as a second object. Besides, adjusting the display state of the first object in the first preview image is represented as: magnifying the first object in the first preview image.

Figure 2A:
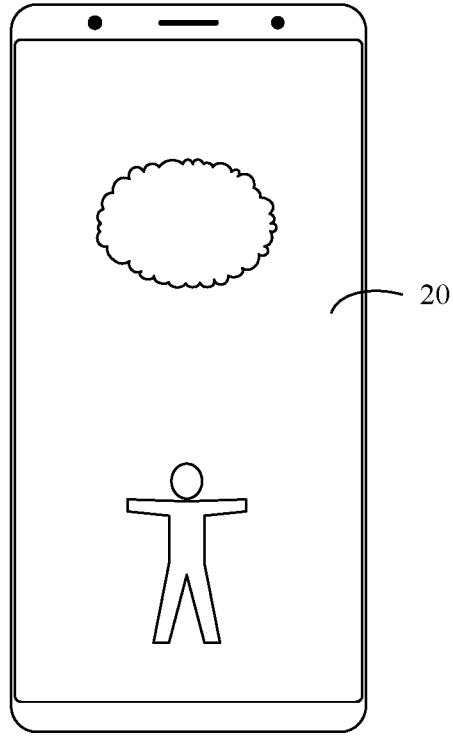
FIG. 2a is a first schematic diagram of an image provided by an embodiment of this application.

A display screen in FIG. 2a displays the first preview image 20 captured by the first camera, and the first preview image 20 includes the first object and the second object whose display states do not change.

Figure 2B:
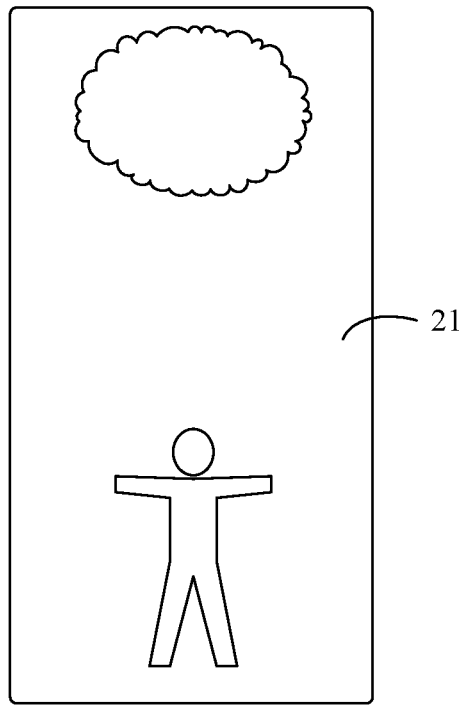
FIG. 2b is a second schematic diagram of an image provided by an embodiment of this application.

In a case that the first input is received, the electronic device may magnify the first preview image 20 in response to the first input to obtain the first processing image 21 shown in FIG. 2b, and the first processing image 21 includes the magnified first object and the magnified second object.

Figure 2C:
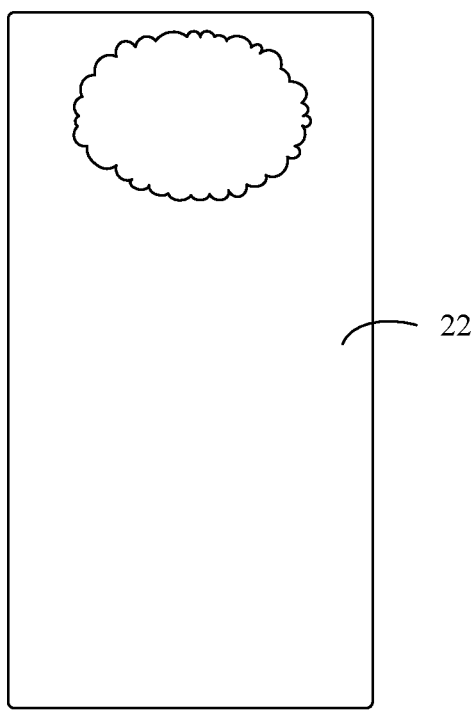
FIG. 2c is a third schematic diagram of an image provided by an embodiment of this application.

FIG. 2c shows the fourth intermediate image 22, and the fourth intermediate image 22 includes the magnified first object.

Figure 2D:
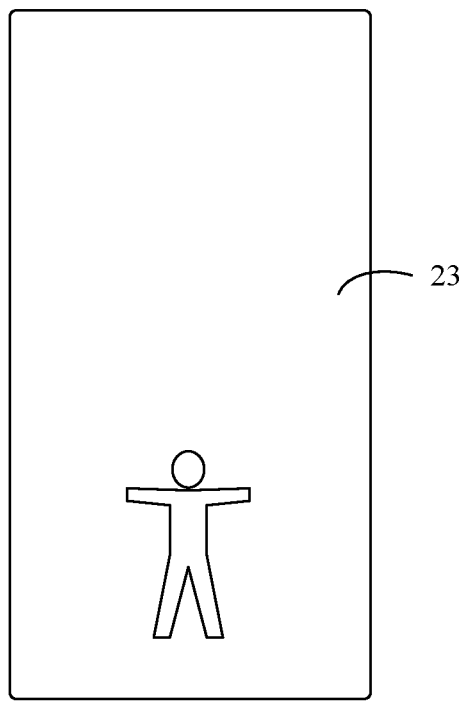
FIG. 2d is a fourth schematic diagram of an image provided by an embodiment of this application.

FIG. 2d shows the fifth intermediate image 23, and the fifth intermediate image 23 includes the second object whose display state does not change.

Figure 2E:
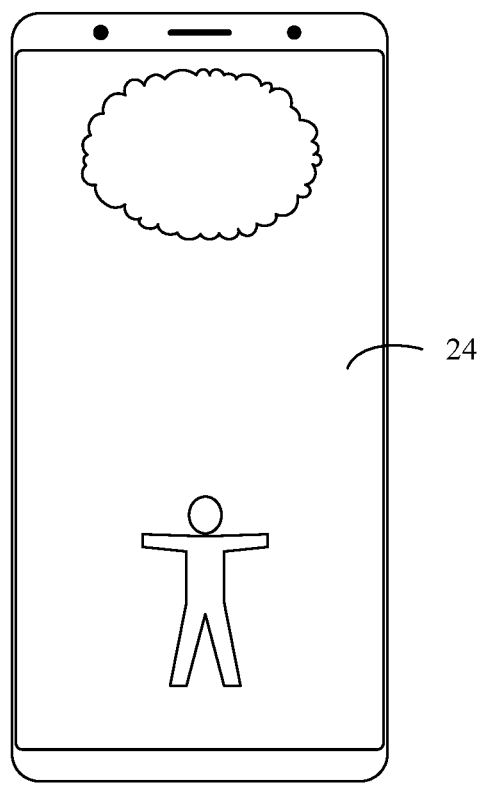
FIG. 2e is a fifth schematic diagram of an image provided by an embodiment of this application.

FIG. 2e shows the second preview image 24, and the second preview image 24 includes the magnified first object and the second object whose display state does not change.

Step 103: image processing is performed on N images captured by N cameras according to display information of the second preview image to obtain a first target image.

During specific implementation, in an implementation, the electronic device may perform, according to the display information of the second preview image, image processing on the N images captured by the N cameras in response to a photographing input to obtain the first target image. In another implementation, the electronic device may, according to a preset frequency, periodically perform image processing on the N images captured by the N cameras according to the display information of the second preview image to obtain the first target image.

the N cameras at least including the main camera, and N being a positive integer. Optionally, in a case that the first camera is the main camera, the N cameras include the main camera; and in a case that the first camera is a first auxiliary camera, the N cameras include the main camera and the first auxiliary camera, and a focusing range of the first auxiliary camera is different from a focusing range of the main camera. Optionally, the display information may but not limited to including at least one of the following: a display effect, a display size or a display position.

In this step, display information of the first target image is the same as the display information of the second preview image. Optionally, display information of the first object of the first target image is the same as display information of the first object of the second preview image, and display information of the other objects of the first target image may be the same as the display information of the second preview image or not, which may be specifically determined according to actual conditions and is not limited in this embodiment of this application. In this way, the first target image also includes the first object whose display state has changed, so that the first target image is different from an image captured by the camera, and thus imaging flexibility is improved.

It may be understood that in a case that the display information of the first target image meets a user demand, the user may execute the photographing input on the electronic device, so the electronic device outputs the first target image meeting the user demand. In this way, imaging may meet the user demand, so that an imaging utilization ratio may be improved.

Through the photographing method in this embodiment, the first input of the user is received, the first input being used for adjusting the display state of the first object in the first preview image, and the first preview image being the image captured by the first camera; a second preview image is displayed in response to the first input, the second preview image being obtained by processing an image captured by a main camera, and the second preview image including the first object whose display state has changed; and according to display information of the second preview image, image processing is performed on N images captured by N cameras to obtain a first target image; the N cameras at least including the main camera, and N being a positive integer. Apparently, this embodiment may make a target image different form the image captured by the camera by adjusting the display state of the object in the image captured by the camera, so that compared with the prior art that imaging is an image captured by a camera, imaging flexibility is improved. Besides, imaging may meet the user demand, so that the imaging utilization ratio may be improved.

In this embodiment of this application, optionally, in a case that the first camera and the main camera are not the same camera, before receiving the first input of the user, the method further includes:

a fifth preview image is displayed, the fifth preview image being an image captured by a main camera;
a fifth input on a first object of the fifth preview image performed by a user is received;
a first object distance corresponding to the first object is obtained in response to the fifth input;
a target camera matching the first object is determined according to the first object distance; and
the first preview image is displayed in a case that the target camera is the first camera.

In this optional implementation, when the electronic device starts a photograph function, the image captured by the main camera may be displayed in a display area.

Given that different cameras are different in focusing ranges and configured to clearly photograph objects in different distances, the electronic device may switch the cameras when photographing the objects with different object distances, so as to improve an imaging resolution. For example, in order to obtain a clearer close-shot image or long-shot image, the electronic device may call a near focal camera to capture the close-shot image, or call a far-focus camera to capture the long-shot image, which is not limited to this.

In this optional implementation, the fifth input acts on the first object, it indicates that the user intends to adjust the display state of the first object, thus, in order to capture the clearer first object, the electronic device may call the target camera matching the first object before adjusting the display state of the first object.

The electronic device may prestore a corresponding relationship between each camera and an object distance photographing range, and the corresponding relationship meets: As for an object within a certain object distance photographing range, an object corresponding to the object captured by a camera corresponding to the object distance photographing range is the clearest. In this way, after receiving the fifth input, the electronic device may obtain the first object distance corresponding to the first object in response to the fifth input, that is, an object distance of an object (entity) corresponding to the first object (imaging of the object), so as to determine the target camera matching the first object according to the first object distance.

During specific implementation, the electronic device may determine a camera corresponding to an object distance photographing range to which the first object distance belongs as the target camera. In a case that the target camera is the first camera, the electronic device may display the image captured by the first camera, that is, the first preview image.

In this optional implementation, the electronic device may determine an object whose display state the user expects to adjust based on an input of the user, call the display area to display an image captured by the target camera corresponding to the object based on an object distance corresponding to the object, and thus adjust the display state of the object through the image, so the imaging resolution may be improved.

In this embodiment of this application, the user may further continue adjusting display states of the other objects in the image captured by the camera through other inputs after adjusting the display state of the first object in the first preview image through the first input. Specific description is as follows.

Optionally, after displaying the second preview image in response to the first input, the method further includes:

a second input performed by a user is received, the second input being used for selecting a second object of the second preview image;
a third preview image is displayed in response to the second input, the third preview image being an image captured by a second camera;
a third input performed by a user is received, the third input being used for adjusting a display state of the second object in the third preview image;
a fourth preview image is displayed in response to the third input, the fourth preview image being obtained by processing the image captured by the main camera, and the fourth preview image including the first object whose display state has changed and the second object whose display state has changed; and
image processing is performed on the N images captured by the N cameras according to display information of the fourth preview image to obtain a second target image.

In this optional implementation, the second camera may be a camera matching the second object. The second input acts on the second object, it indicates that the user intends to adjust the display state of the second object, thus, in order to capture the clearer second object, the electronic device may call the camera matching the second object before adjusting the display state of the second object and display an image captured by the camera, so that the user adjusts the display state of the second object through the input.

Displaying the fourth preview image in response to the third input may include:

a display state of the third preview image or the display state of the second object of the third preview image is adjusted in response to the third input to obtain a second processing image;
sixth image processing is performed on the second processing image to obtain a sixth intermediate image, the sixth intermediate image only including sixth pixel information in the second processing image, and the sixth pixel information being pixel information corresponding to the second object in the second processing image;
seventh image processing is performed on the second preview image to obtain a seventh intermediate image, the seventh intermediate image including all pixel information in the fourth image except for the seventh pixel information, and the seventh pixel information being the pixel information corresponding to the second object in the second preview image; and the sixth intermediate image and the seventh intermediate image are composited to obtain the fourth preview image.

It needs to be noted that an obtaining mode of the fourth preview image is similar to an obtaining principle of the second preview image, which may specifically refer to the above description and is not repeated in detail here.

For ease of understanding, example description is as follows with reference to FIG. 2a to FIG. 3e.

In the following example, it is assumed that an image captured by each camera includes two objects of "cloud" and "people", "cloud" is regarded as the first object, and "people" is regarded as a second object. Besides, adjusting the display state of the second object in the second preview image is represented as: minifying the second object in the second preview image.

Figure 3A:
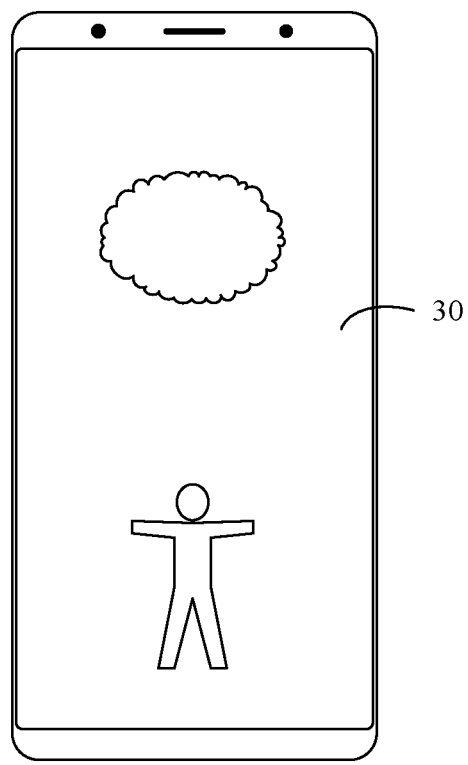
FIG. 3a is a sixth schematic diagram of an image provided by an embodiment of this application.

A display screen in FIG. 3a displays the third preview image 30 captured by a third camera, and the third preview image 30 includes the first object and the second object whose display states do not change.

Figure 3B:
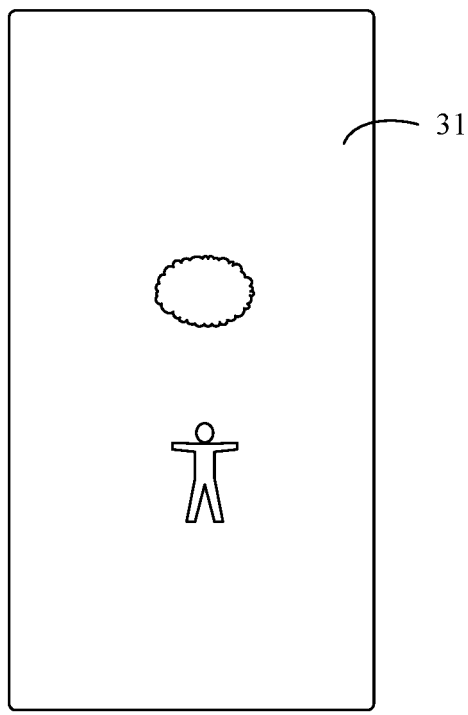
FIG. 3b is a seventh schematic diagram of an image provided by an embodiment of this application.

In a case that the third input is received, the electronic device may minify the third preview image 30 in response to the third input to obtain the second processing image 31 shown in FIG. 3b, and the second processing image 31 includes the minified first object and the minified second object.

Figure 3C:
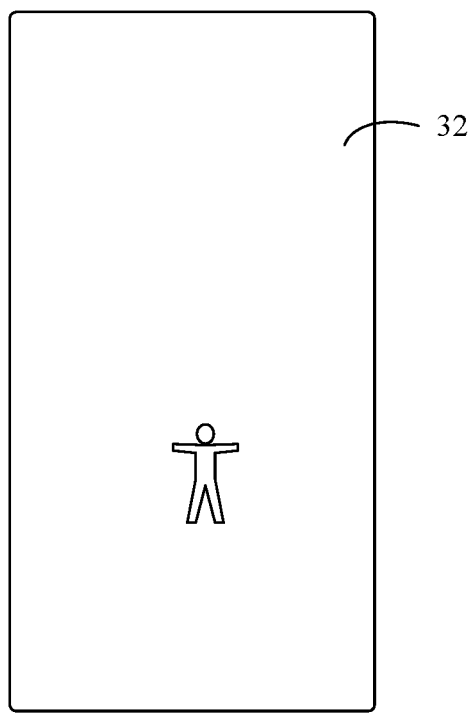
FIG. 3c is an eighth schematic diagram of an image provided by an embodiment of this application.

FIG. 3c shows the sixth intermediate image 32, and the sixth intermediate image 32 includes the minified second object.

Figure 3D:
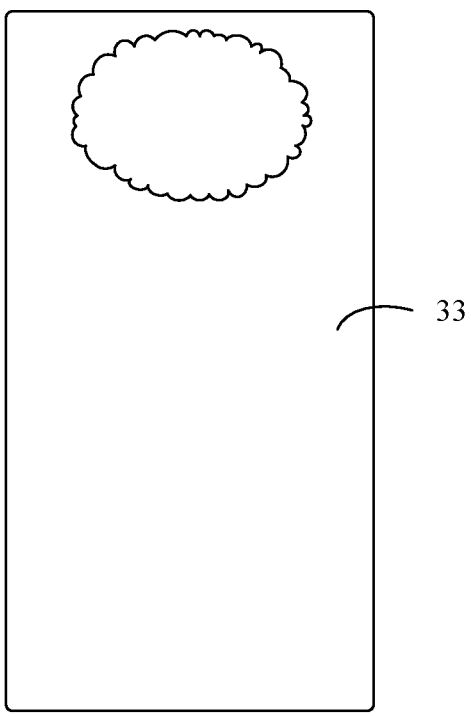
FIG. 3d is a ninth schematic diagram of an image provided by an embodiment of this application.

FIG. 3d shows the seventh intermediate image 33, the seventh intermediate image 33 is obtained by performing seventh image processing on the second preview image 34 in FIG. 2e, and the seventh intermediate image 33 includes the magnified first object.

Figure 3E:
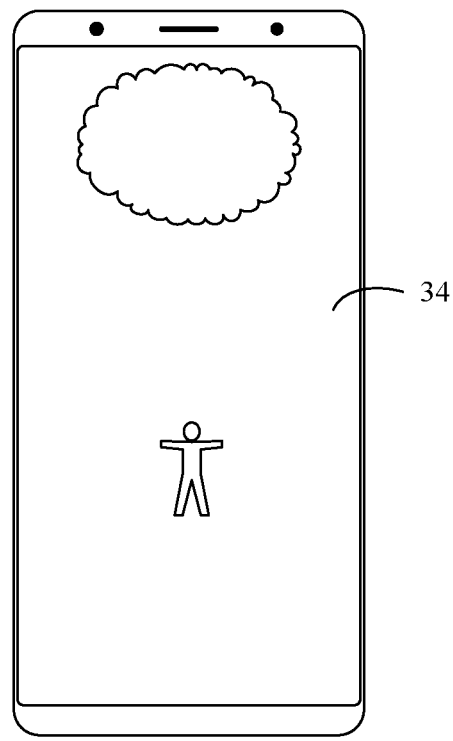
FIG. 3e is a tenth schematic diagram of an image provided by an embodiment of this application.

FIG. 3e shows the fourth preview image 34, and the fourth preview image 34 includes the magnified first object and the second object which is not minified.

In this optional implementation, after adjusting the display state of the first object in the first preview image through the first input, the user further adjusts the display state of the second object in the third preview image through the third input, and thus, the electronic device may perform, according to the display information of the fourth preview image, image processing on the N images captured by the N cameras to obtain the second target image.

The N cameras may meet any one of the following:
a) in a case that both the first camera and the second camera are the main cameras, the N cameras include the main cameras;
b) in a case that the first camera (or the second camera) is the first auxiliary camera and the second camera (or the first camera) is the main camera, the N cameras include the main camera and the first auxiliary camera (or the second camera), and the focusing range of the first auxiliary camera is different from the focusing range of the main camera; and
c) in a case that the first camera is the first auxiliary camera and the second camera is a second auxiliary camera, the N cameras include the main camera, the first auxiliary camera and the third camera, and focusing ranges of the first auxiliary camera, the second auxiliary camera and the main camera are different.

In this optional implementation, in an implementation, the electronic device may composite the first intermediate image, the second intermediate image and the third intermediate image according to the display information in the fourth preview image in response to a photographing input to obtain the second target image. In another implementation, the electronic device may, according to a preset frequency, periodically composite the first intermediate image, the second intermediate image and the third intermediate image according to the display information in the fourth preview image to obtain the second target image.

The display information of the second target image is the same as the display information of the fourth preview image. Optionally, the display information of the first object and the second object of the second target image is the same as the display information of the first object and the second object in the fourth preview image, and display information of the other objects of the second target image may be the same as the display information of the fourth preview image or not, which may be specifically determined according to actual conditions and is not limited in this embodiment of this application. In this way, the first target image may also include the first object whose display state has changed and the second object whose display state has changed, so the second target image is different from the image captured by the camera, and thus imaging flexibility is improved.

As for c), optionally, processing, according to the display information of the fourth preview image, the N images captured by the N cameras to obtain the target image includes:
a first image, a second image and a third image are obtained, the first image being an image captured by the main camera at a first moment, the second image being an image captured by the first auxiliary camera at the first moment, and the third image being an image captured by the second auxiliary camera at the first moment;
first image processing is performed on the first image to obtain the first intermediate image, the first intermediate image including all pixel information in the first image except for first pixel information, and the first pixel information being pixel information corresponding to the first object and the second object in the first image;
second image processing is performed on the second image to obtain the second intermediate image, the second intermediate image only including second pixel information in the second image, and the second pixel information being pixel information corresponding to the first object in the second image;
third image processing is performed on the third image to obtain the third intermediate image, the third intermediate image only including third pixel information in the second image, and the third pixel information being pixel information corresponding to the second object in the third image; and
the first intermediate image, the second intermediate image and the third intermediate image are composited according to the display information in the fourth preview image to obtain the second target image;
the first moment being a moment earlier than an input moment of the photographing input, or the first moment being a moment later than the input moment of the photographing input.

Optionally, in an implementation that the electronic device obtains the second target image in response to the photographing input, the first moment may be the moment earlier than the input moment of the photographing input, or the first moment is the moment later than the input moment of the photographing input; and in an implementation that the electronic device periodically obtains the second target image, the first moment may be a moment earlier than a start moment of a period, or the first moment is a moment later than the start moment of the period.

In a case that the first moment is the moment earlier than the input moment (or the start moment of the period) of the photographing input, the first image may be an image captured by the main camera from a queue tail of a buffer queue corresponding thereto, the second image may be an image captured by the first camera from a queue tail of the buffer queue corresponding thereto, and the third image may be an image captured by the second auxiliary camera from a queue tail of a buffer queue corresponding thereto.

In a case that the first moment is the moment later than the input moment (or the start moment of the period) of the photographing input, the first image may be an image outputted after photosensitizing of a sensor of the main camera, the second image may be an image outputted after photosensitizing of a sensor of the first auxiliary camera, and the third image may be an image outputted after photosensitizing of a sensor of the second auxiliary camera.

During specific implementation, the electronic device may obtain the first intermediate image by deleting the first pixel information of the first image; obtain the second intermediate image by deleting all pixel information in the second image except for the second pixel information; and obtain the third intermediate image by deleting all pixel information in the third image except for the third pixel information.

After the first intermediate image, the second intermediate image and the third intermediate image are obtained, the electronic device may composite the first intermediate image, the second intermediate image and the third intermediate image according to the display information in the fourth preview image to obtain the second target image.

It needs to be noted that in a case that a blank area exists in the second target image, the electronic device may but not limited to using an interpolation processing mode to perform pixel filling on the blank area of the second target image by adopting adjacent pixel information of the blank area so as to improve an imaging effect.

The first input of this embodiment of this application is described below.

Optionally, before receiving the first input performed by the user, the method further includes:

a fourth input on the first object in the first preview image performed by a user is received; and a first display state adjusting control associated with the first object is displayed in the first preview image in response to the fourth input; and receiving the first input performed by the user includes:

a first input on the first display state adjusting control performed by the user is received;

different objects in the first preview image being associated with different display state adjusting controls.

In this optional implementation, before executing the first input, the user may trigger the electronic device through the fourth input to display the first display state adjusting control associated with the first object.

During specific implementation, the fourth input may be: a swiping input whose input trajectory surrounds the first object, or a tap input for tapping the first object, but is not limited to this.

Further, receiving the first input on the first display state adjusting control performed by the user includes:

in a case that the first display state adjusting control includes a first sub-control and a second sub-control, a first input on the first sub-control or the second sub-control performed by the user is received, the first sub-control being used for adjusting a display size of one object, and the second sub-control being used for adjusting a display position of one object; and in a case that the first display state adjusting control includes a first display mode and a second display mode, a first input on the first display state adjusting control in the first display mode or the first display state adjusting control in the second display mode performed by the user is received, the first display state adjusting control in the first display mode being used for adjusting the display size of one object; and the first display state adjusting control in the second display mode being used for adjusting the display position of one object.

For ease of understanding, example description is as follows with reference to FIG. 4 to FIG. 5*b*.

Figure 4:
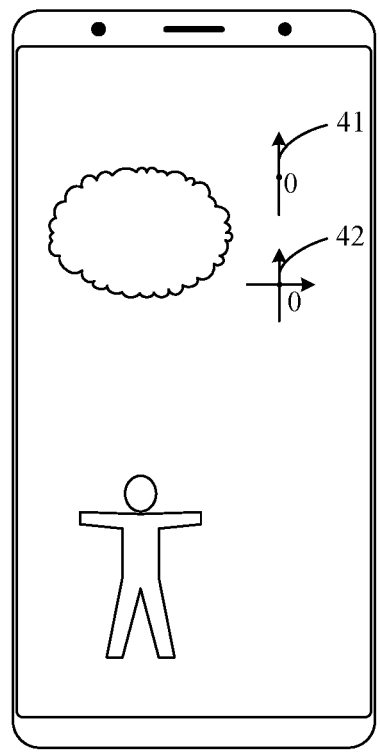
FIG. 4 is a first schematic diagram of a display state adjusting control provided by an embodiment of this application.

In FIG. 4, the first display state adjusting control includes the first sub-control 41 and the second sub-control 42. During specific implementation, if the user intends to adjust a display size of the first object, it may be implemented by touching the first sub-control 41 of the first display state adjusting control; and if the user intends to adjust a display position of the first object, it may be implemented by touching the second sub-control 42 of the first display state adjusting control. In this way, the user may implement adjusting the display size and the display position of the object by touching the different sub-controls, so that independence of adjustment of the display state of the object may be improved, and a mistaken trigger ratio of adjustment of the display state may be reduced.

Figure 5A:
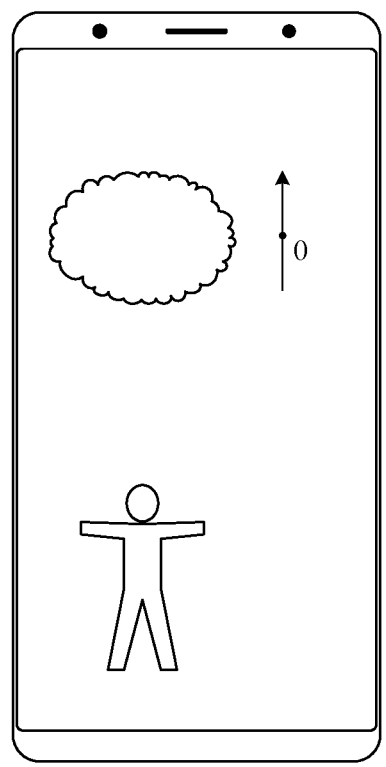
FIG. 5a is a second schematic diagram of a display state adjusting control provided by an embodiment of this application.
Figure 5B:
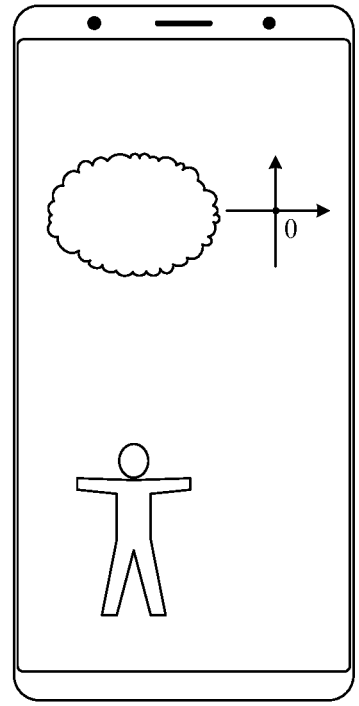
FIG. 5b is a third schematic diagram of a display state adjusting control provided by an embodiment of this application.

In FIG. 5*a* and FIG. 5*b*, the first display state adjusting control includes the first display mode and the second display mode. FIG. 5*a* shows that the first display state adjusting control is in the first display mode, and FIG. 5*b* shows that the first display state adjusting control is in the second display mode. During specific implementation, if the user intends to adjust the display size of the first object, an input may be executed to trigger the electronic device to set the first display state adjusting control to be in the first display mode; and if the user intends to adjust the display position of the first object, an input may be executed to trigger the electronic device to set the first display state adjusting control to be in the second display mode. In this way, the user may implement adjustment of the display size and the display position of the object through different display modes of one display state adjusting control, so that the number of controls to be set may be reduced.

Example description is made below for an application scene that the first input is an input on the first display state adjusting control performed by the user and the first display state adjusting control includes the first display mode and the second display mode.

The electronic device may photograph the same scene by means of a plurality of cameras and implement distance switching of a close shot and a long shot by adjusting a multiple bar (namely, the first display state adjusting control in the first display mode) for magnifying and minifying. Distance switching may be implemented by fusion of a scene of different multiples photographed by the plurality of cameras. For example, using two cameras for simultaneously photographing and controlling magnified multiples of objects may be used for a scene that some users intend to photograph a close-up, for example, the user takes a picture of an entire fruit tree, if he intends to magnify one fruit on the fruit tree for a close-up, the fruit may be magnified, fusion processing may be performed on a picture part with the magnified fruit and a picture with the entire fruit tree, and a close-up of a detail of a certain area or a photographed object in an entire scene may be implemented.

The plurality of cameras may be mounted on the electronic device so as to implement a dolly zoom effect, an existing device has but not limited to three cameras, including an ultra-wide lens (Ultra), a wide-angle lens (Wide) or a telephoto lens (Tele), and all the lenses have different focal lengths and different lens coverages, which may be selected for use according to how far from the target object. For example, when closer to the target object, a video is suitable for being captured by the ultra-wide lens; when moderately far from the target object, a video is suitable for being captured by the wide-angle lens; and when so far from the target object, a video is suitable for being captured by the telephoto lens.

If the plurality of cameras are mounted on the electronic device, the cameras mounted on the electronic device may be a combination of the ultra-wide lens and the wide-angle lens, a combination of the wide-angle lens and the telephoto lens or a combination of the ultra-wide lens, the wide-angle lens and the telephoto lens. Combinations of the different lenses may be suitable for demands of different photographing ranges, for example, as for the combination of the ultra-wide lens and the wide-angle lens, if a magnified-minified multiple suitable for the wide-angle lens is a range of 1-2 and it is lower than the range, then unclear imaging may be caused, so a clear image with the magnified-minified multiple being lower than 1 needs to be further captured, the wide-angle lens needs to be switched to the ultra-wide lens, and thus a better photographing effect is achieved.

The electronic device may implement calling different cameras to photograph a close shot and a long shot respectively through the plurality of cameras on the electronic device, so as to achieve an effect of a better resolution. Specific implementation includes the following steps.

Step 1, in a photographing process, the user may touch a drag multiple bar associated with a long-shot object so as to adjust and control a magnified or minified multiple of a far-focus camera.

As shown in FIG. 5a, a multiple bar may appear after the user touches a screen, that is, an adjustable multiple range. Optionally, the adjustable multiple range may be 1-4 and may be divided into 40 gaps, for example, may be a multiple of 1.1, 1.2, 1.3 . . . .

Step 2, in the photographing process, the user may touch a drag multiple bar bound to a close-shot object so as to adjust and control a magnified or minified multiple of a near focal camera.

As for selection of the long shot and the close shot, the user may circle the to-be-processed long-shot or close-shot object on the screen and then taps the circled object, so the multiple bar appears.

The different cameras are selected through a distance of an object touched by the user, for example, the object touched by the user belongs to a close shot, at this moment, a focus point is at the close shot, a distance of the object may be measured through a laser ranging or binocular ranging method, the near focal camera is called if it is judged as the close shot, a judgment threshold of this distance may be set to be that if a distance of a focused object is smaller than 1 m, it is the close shot and the near focal camera is called, and if the distance is greater than 1 m, it is the long shot and the far-focus camera is called, and setting of a specific threshold is determined according to a focal length of the camera.

If touching the close shot, the near focal camera is called, a focal length of the near focal camera is small, and the close shot may be photographed relatively clearly. If touching the long shot, the far-focus camera is called, a focal length of the far-focus camera is long, and the long shot may be photographed clearly. It is well known that when a terminal photographs an object closer to the terminal, imaging of the object is large, and when an object far from the terminal is photographed, imaging of the object is photographed smaller and smaller in a size with a distance farther and farther, so to change this photographing effect distance may be implemented by magnifying or minifying the object.

Therefore, if the user intends to magnify or minify a distance of the long shot and the close shot, a minified multiple may be set by touching the close-shot object, for example, a swiping bar is 1.2, it indicates to be minified to 1.2 times an original size; and a magnified multiple may be set by touching the long-shot object, for example, a multiple bar is 2.5, it indicates to be magnified to 2.5 times an original size.

A process of image processing is: through an object magnified multiple selected by the user, two cameras are used for processing respectively to generate two frames of digital zoom, one frame is a frame of a magnified long shot, the other frame is a frame of a minified close shot, then a base frame which is not processed is generated by using the far-focus camera, objects corresponding to the magnified frame and the minified frame are cut out respectively and fused into corresponding positions on the base frame to cover an original object, an object edge after fusion may be subjected to interpolation processing with surrounding pixels, so an edge is smoothly transited, and finally an entire picture is formed by compositing.

As shown in FIG. 3e, change in the distance of the long shot and the close shot is implemented by changing the magnified multiple of the long shot and the close shot, and an effect may be seen in the figure that the close-shot people which is minified and the long-shot cloud which is magnified are composited.

Apparently, the user may adjust the display size of the object in the image through the multiple bar, so as to implement distance switching of the long shot and the close shot. Besides, the electronic device captures images of objects with different object distances through the different cameras, so a definition of the long shot and the close shot may be guaranteed.

If the user intends to change a position of the object in the image, a coordinate axis (namely, the first display state adjusting control in the second display mode) may appear after double-tapping the multiple bar, and this coordinate axis is an azimuthal coordinate and may be used for changing the position of the object in the image.

During specific implementation, touching the long shot and the close shot may trigger the electronic device to make the coordinate axis appear beside, as shown in FIG. 5b. An axis x and an axis y of the coordinate axis represent horizontal and vertical positions respectively, an origin is an original position of the object, the user may swipe position coordinates of the axis x and the axis y respectively, for example, the user swipes the axis x to be 1 and the axis y to be 2, that is, a position with a coordinate (1, 2), and it indicates that the object is to be moved by 1 m horizontally and rightwards and then moved by 2 m vertically and upwards. A user position (−0.1, −0.5) indicates that the object is moved by 1 cm horizontally and leftwards and then moved by 5 cm vertically and downwards, if the user swipes only the axis x, the object is moved only in a horizontal direction, and if the user swipes only the axis y, the object is moved only in a vertical direction.

After adjusting azimuths of the long shot and the close shot, the objects of the close shot and the long shot are cut out according to the different azimuths adjusted by the user, and subjected to image fusion in the corresponding positions separately, and the rest of cutout parts may be calculated and filled by using a peripheral difference.

Apparently, the user may adjust the position of the object in the image through the coordinate axis, and thus adjusting the object long shot and close shot distance is more flexible.

It needs to be noted that in other implementations, the first input may be an input in which an input position includes the first object. Further, the first input may be an input in which a start input position is the first object. In this case, the first input may start to be executed at an object of which the display state the user expects to adjust. In this way, the electronic device may determine the first object as the object corresponding to the start input position of the first input. For example, when the user expects to adjust the display state of the first object, the first input may start to be executed in the display position of the first object, and the electronic device is triggered to adjust the display state of the first object.

It may be understood that various optional implementations introduced in this embodiment of this application may be combined mutually to be implemented or may also be implemented independently, which is not limited in this embodiment of this application.

In the photographing method provided by this embodiment of this application, an executive body may be a photographing apparatus, or a control module in the photographing apparatus for executing the photographing method. In this embodiment of this application, the photographing apparatus provided by an embodiment of this application is described by taking the photographing apparatus executing the photographing method as an example.

Figure 6:
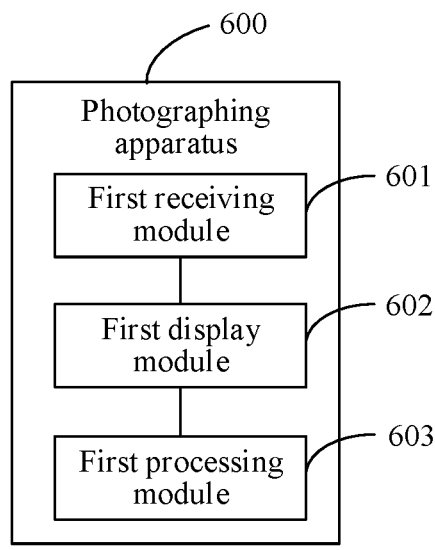
FIG. 6 is a structural diagram of a photographing apparatus provided by an embodiment of this application.

Referring to FIG. 6, which is a structural diagram of a photographing apparatus provided by an embodiment of this application.

As shown in FIG. 6, the photographing apparatus 600 includes:
- a first receiving module 601, configured to receive a first input performed by a user, the first input being used for adjusting a display state of a first object in a first preview image, and the first preview image being an image captured by a first camera;
- a first display module 602, configured to display a second preview image in response to the first input, the second preview image being obtained by processing an image captured by a main camera, and the second preview image including the first object whose display state has changed; and
- a first processing module 603, configured to perform, according to display information of the second preview image, image processing on N images captured by N cameras to obtain a first target image;
- the N cameras at least including the main camera, and N being a positive integer.

Optionally, in a case that the first camera is the main camera, the N cameras include the main camera; and
in a case that the first camera is a first auxiliary camera, the N cameras include the main camera and the first auxiliary camera, and a focusing range of the first auxiliary camera is different from a focusing range of the main camera.

The display information includes at least one of the following: a display effect, a display size or a display position.

Optionally, the photographing apparatus 600 further includes:
- a second receiving module, configured to receive a second input performed by a user, the second input being used for selecting a second object of the second preview image;
- a second display module, configured to display a third preview image in response to the second input, the third preview image being an image captured by a second camera;
- a third receiving module, configured to receive a third input performed by a user, the third input being used for adjusting a display state of the second object in the third preview image;
- a third display module, configured to display a fourth preview image in response to the third input, the fourth preview image being obtained by processing the image captured by the main camera, and the fourth preview image including the first object whose display state has changed and the second object whose display state has changed; and
- a second processing module, configured to perform, according to display information of the fourth preview image, image processing on the N images captured by the N cameras to obtain a second target image.

Optionally, in a case that the first camera is a first auxiliary camera, the second camera is a second auxiliary camera, and focusing ranges of the first auxiliary camera, the second auxiliary camera and the main camera are different, the N cameras include the main camera, the first auxiliary camera and the second auxiliary camera.

The second processing module includes:
- an obtaining unit, configured to obtain a first image, a second image and a third image, the first image being an image captured by the main camera at a first moment, the second image being an image captured by the first auxiliary camera at the first moment, and the third image being an image captured by the second auxiliary camera at the first moment;
- a first processing unit, configured to perform first image processing on the first image to obtain the first intermediate image, the first intermediate image including all pixel information in the first image except for first pixel information, and the first pixel information being pixel information corresponding to the first object and the second object in the first image;
- a second processing unit, configured to perform second image processing on the second image to obtain the second intermediate image, the second intermediate image only including second pixel information in the second image, and the second pixel information being pixel information corresponding to the first object in the second image;
- a third processing unit, configured to perform third image processing on the third image to obtain the third intermediate image, the third intermediate image only including third pixel information in the second image, and the third pixel information being pixel information corresponding to the second object in the third image; and
- a compositing unit, configured to composite the first intermediate image, the second intermediate image and the third intermediate image according to the display information in the fourth preview image to obtain the second target image;

the first moment being a moment earlier than an input moment of the photographing input, or the first moment being a moment later than the input moment of the photographing input.

Optionally, the photographing apparatus 600 further includes:
a fourth receiving module, configured to receive a fourth input on the first object in the first preview image performed by a user; and
a fourth display module, configured to display a first display state adjusting control associated with the first object in the first preview image in response to the fourth input; and
the first receiving module 601 is specifically configured to:
receive a first input on the first display state adjusting control performed by the user;
different objects in the first preview image being associated with different display state adjusting controls.

Optionally, the first receiving module 601 is specifically configured to:
receive a first input on a first sub-control or a second sub-control performed by the user in a case that the first display state adjusting control includes the first sub-control and the second sub-control, the first sub-control being used for adjusting a display size of one object, and the second sub-control being used for adjusting a display position of one object; and
receive a first input on the first display state adjusting control in a first display mode or the first display state adjusting control in a second display mode performed by the user in a case that the first display state adjusting control includes the first display mode and the second display mode, the first display state adjusting control in the first display mode being used for adjusting the display size of one object; the first display state adjusting control in the second display mode being used for adjusting the display position of one object.

Optionally, in a case that the first camera and the main camera are not the same camera, before receiving the first input performed by the user, the photographing apparatus 600 further includes:
a fifth display module, configured to display a fifth preview image, the fifth preview image being an image captured by a main camera;
a firth receiving module, configured to receive a fifth input on a first object of the fifth preview image performed by a user;
an obtaining module, configured to obtain a first object distance corresponding to the first object in response to the fifth input;
a determining module, configured to determine a target camera matching the first object according to the first object distance; and
a sixth display module, configured to display the first preview image in a case that the target camera is the first camera.

The photographing apparatus in this embodiment of this application may be an apparatus, or may also be a component or an integrated circuit or a chip in a terminal. The apparatus may be an electronic device.

The photographing apparatus in this embodiment of this application may be an apparatus with an operating system. The operating system may be an Android (Android) operating system, may be an ios operating system, or may be another possible operating system, which is not specifically limited in the embodiments of this application.

The photographing apparatus 600 provided by this embodiment of this application can implement all processes of implementation of the method embodiment in FIG. 1. to achieve the same technical effect, and to avoid repetition, details are not described herein again.

Figure 7:
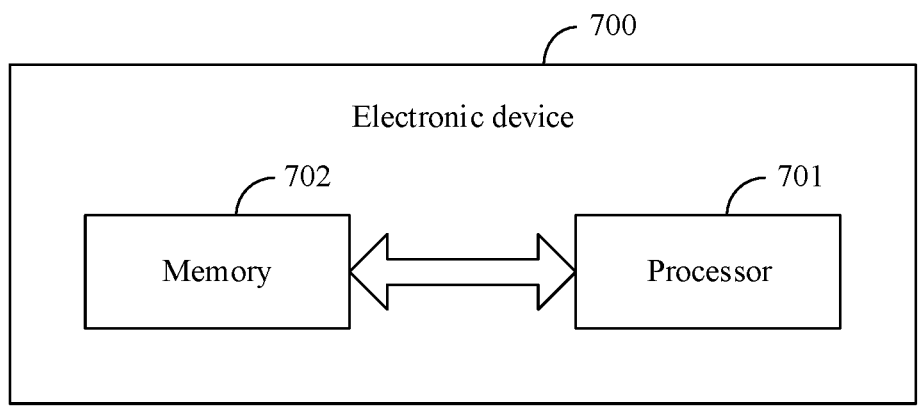
FIG. 7 is a first structural diagram of an electronic device provided by an embodiment of this application.

Optionally, as shown in FIG. 7, an embodiment of this application further provides an electronic device 700, including a processor 701, a memory 702, and a program or an instruction stored on the memory 702 and capable of running on the processor 701, the program or the instruction, when executed by the processor 701, implementing all processes of the above method embodiment in FIG. 1, which can achieve the same technical effect. To avoid repetition, details are not described herein again.

Figure 8:
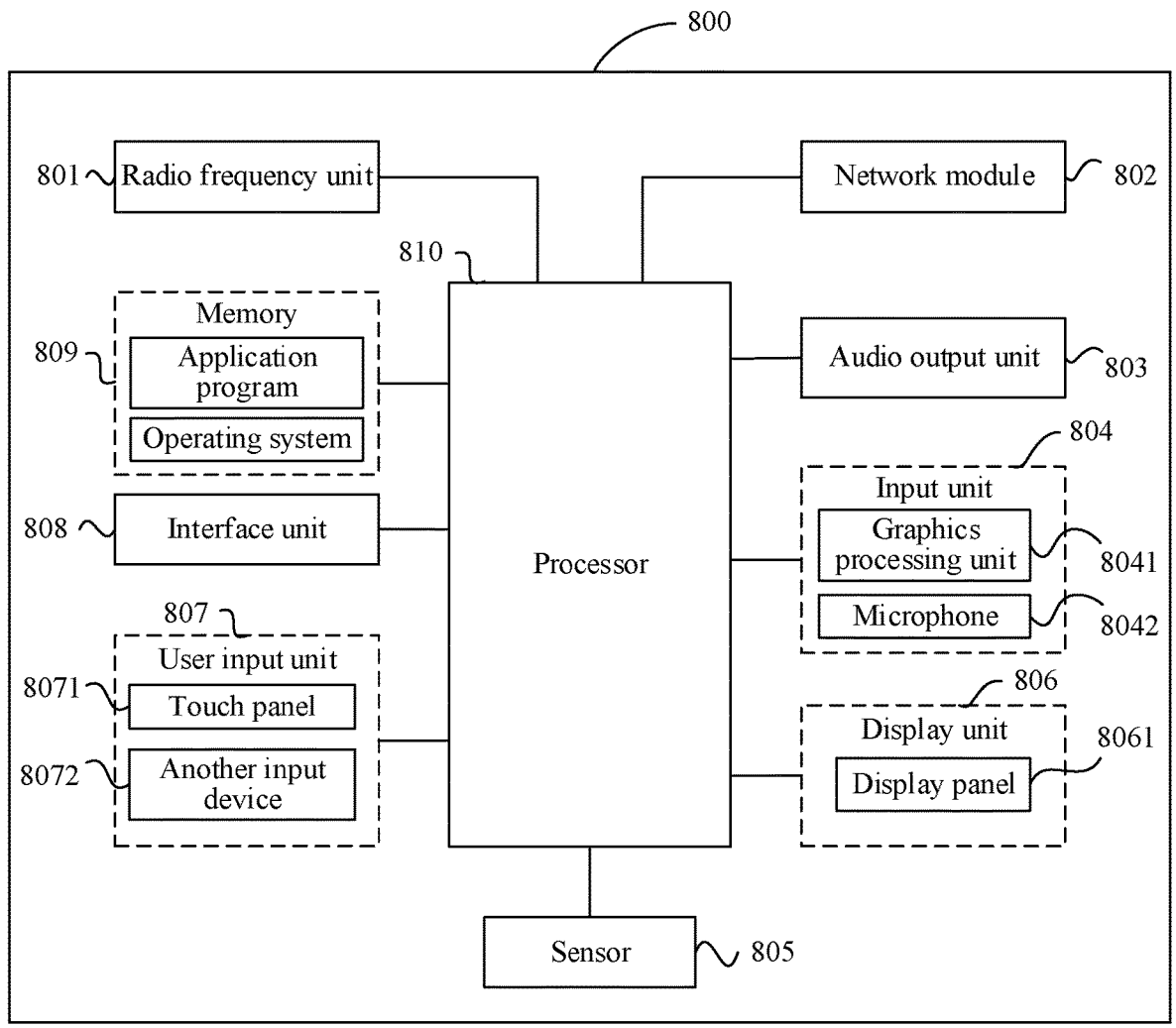
FIG. 8 is a second structural diagram of an electronic device provided by an embodiment of this application.

FIG. 8 is a schematic diagram of a hardware structure of a terminal for implementing embodiments of this application.

The electronic device 800 includes but is not limited to: components such as a radio frequency unit 801, a network module 802, an audio output unit 803, an input unit 804, a sensor 805, a display unit 806, a user input unit 807, an interface unit 808, a memory 809 and a processor 810.

Those skilled in the art may understand that the electronic device 800 may further include a power supply (such as a battery) for supplying power to the various components. The power supply may be logically connected to the processor 810 by using a power management system, thereby implementing functions, such as charging, discharging, and power consumption management by using the power management system. A structure of the electronic device shown in FIG. 8 constitutes no limitation on the electronic device, and the electronic device may include more or fewer components than those shown in the figure, or some components may be combined, or a different component deployment may be used, which is not repeated in detail here.

It is to be understood that in the embodiments of this application, the input unit 804 may include a graphics processing unit (Graphics Processing Unit, GPU) 8041 and a microphone 8042. The graphics processing unit 8041 performs processing on image data of a static picture or a video that is obtained by an image acquisition device (such as a camera) in a video acquisition mode or an image acquisition mode. The display unit 806 may include a display panel 8061. The display panel 8061 may be configured in the form of a liquid crystal display, an organic light-emitting diode, or the like. The user input unit 807 includes a touch panel 8071 and another input device 8072. The touch panel 8071 is also called a touch screen. The touch panel 8071 may include two parts: a touch detection apparatus and a touch controller. The another input device 8072 may include, but is not limited to, a physical keyboard, a functional key (such as a volume control key or a switch key), a track ball, a mouse, and a joystick, which is not described herein in detail. The memory 809 may be configured to store a software program and various data, including but not limited to an application program and an operating system. The processor 810 may integrate an application processor and a modem processor. The application processor mainly processes an operating system, a user interface, an application program, and the like. The modem processor mainly processes wireless communication. It may be understood that, the above modem processor may not be integrated into the processor 810.

The processor 810 is configured to:
receive a first input performed by a user through the user input unit 807, the first input being used for adjusting a display state of a first object in a first preview image, and the first preview image being an image captured by a first camera;

display a second preview image through the display unit 806 in response to the first input, the second preview image being obtained by processing an image captured by a main camera, and the second preview image including the first object whose display state has changed; and perform, according to display information of the second preview image, image processing on N images captured by N cameras to obtain a first target image;

the N cameras at least including the main camera, and N being a positive integer.

Optionally, in a case that the first camera is the main camera, the N cameras include the main camera; and in a case that the first camera is a first auxiliary camera, the N cameras include the main camera and the first auxiliary camera, and a focusing range of the first auxiliary camera is different from a focusing range of the main camera.

The display information includes at least one of the following: a display effect, a display size or a display position.

Optionally, the processor 810 is further configured to:

receive a second input performed by a user through the user input unit 807, the second input being used for selecting a second object of the second preview image;

display a third preview image through the display unit 806 in response to the second input, the third preview image being an image captured by a second camera;

receive a third input performed by a user through the user input unit 807, the third input being used for adjusting a display state of the second object in the third preview image;

display a fourth preview image through the display unit 806 in response to the third input, the fourth preview image being obtained by processing the image captured by the main camera, and the fourth preview image including the first object whose display state has changed and the second object whose display state has changed; and perform image processing on the N images captured by the N cameras according to display information of the fourth preview image to obtain a second target image.

Optionally, in a case that the first camera is a first auxiliary camera, the second camera is a second auxiliary camera, and focusing ranges of the first auxiliary camera, the second auxiliary camera and the main camera are different, the N cameras include the main camera, the first auxiliary camera and the second auxiliary camera.

the processor 810 is further configured to:

obtain a first image, a second image and a third image, the first image being an image captured by the main camera at a first moment, the second image being an image captured by the first auxiliary camera at the first moment, and the third image being an image captured by the second auxiliary camera at the first moment;

perform first image processing on the first image to obtain the first intermediate image, the first intermediate image including all pixel information in the first image except for first pixel information, and the first pixel information being pixel information corresponding to the first object and the second object in the first image;

perform second image processing on the second image to obtain the second intermediate image, the second intermediate image only including second pixel information in the second image, and the second pixel information being pixel information corresponding to the first object in the second image;

perform third image processing on the third image to obtain the third intermediate image, the third intermediate image only including third pixel information in the second image, and the third pixel information being pixel information corresponding to the second object in the third image; and composite the first intermediate image, the second intermediate image and the third intermediate image according to the display information in the fourth preview image to obtain the second target image;

the first moment being a moment earlier than an input moment of the photographing input, or the first moment being a moment later than the input moment of the photographing input.

Optionally, the processor 810 is further configured to:

receive a fourth input on the first object in the first preview image performed by a user through the user input unit 807;

display a first display state adjusting control associated with the first object in the first preview image through the display unit 806 in response to the fourth input; and receive a first input on the first display state adjusting control performed by a user through the user input unit 807;

different objects in the first preview image being associated with different display state adjusting controls.

Optionally, the processor 810 is further configured to:

receive a first input on a first sub-control or a second sub-control performed by the user through the user input unit 807 in a case that the first display state adjusting control includes the first sub-control and the second sub-control, the first sub-control being used for adjusting a display size of one object, and the second sub-control being used for adjusting a display position of one object; and receive a first input on the first display state adjusting control in a first display mode or the first display state adjusting control in a second display mode performed by the user through the user input unit 807 in a case that the first display state adjusting control includes the first display mode and the second display mode, the first display state adjusting control in the first display mode being used for adjusting the display size of one object; the first display state adjusting control in the second display mode being used for adjusting the display position of one object.

Optionally, in a case that the first camera and the main camera are not the same camera, the processor 810 is further configured to:

display a fifth preview image through the display unit 806, the fifth preview image being an image captured by the main camera;

receive a fifth input on a first object of the fifth preview image performed by a user through the user input unit 807;

obtain a first object distance corresponding to the first object in response to the fifth input;

determine a target camera matching the first object according to the first object distance; and display the first preview image through the display unit 806 in a case that the target camera is the first camera.

It needs to be noted that in this embodiment, the above electronic device 800 can implement all processes in the method embodiment in FIG. 1 and achieve the same beneficial effect. To avoid repetition, details are not described herein again.

An embodiment of this application further provides a readable storage medium, storing a program or an instruction, the program or the instruction, when executed by a processor, implementing all processes of the foregoing photographing method embodiment and achieving the same technical effect, which is not described in detail herein again to avoid repetition.

The processor is the processor in the electronic device in the above embodiment. The readable storage medium includes a computer-readable storage medium, for example, a read-only memory (Read-Only Memory, ROM), a random access memory (Random Access Memory, RAM), a magnetic disk, an optical disc or the like of a computer.

An embodiment of this application further provides a chip, including a processor and a communication interface, the communication interface being coupled to the processor, the processor being configured to run a program or an instruction so as to implement all processes of the above photographing method embodiment and achieve the same technical effects, which is not described in detail herein again to avoid repetition. It is to be understood that the chip provided by this embodiment of this application may also be called a system-on-a-chip, or the like.

It needs to be noted that the terms "include", "comprise", or any other variation thereof herein are intended to cover a non-exclusive inclusion, so that a process, a method, an object or an apparatus including a series of elements may not only include those elements, but also include other elements which are not explicitly listed, or further include elements inherent to this process, method, object or apparatus. Without more limitations, elements defined by the sentence "including one . . . " do not exclude that there are still other same elements in the process, method, object or apparatus including the elements. Besides, it needs to be indicated that a scope of the method and apparatus in the implementations of this application is not limited to function executing according to a shown or discussed sequence, functions may also be executed in a basically simultaneous mode or an opposite sequence according to the involved functions, for example, the described method may be executed according to a sequence different from the described sequence, and various steps may also be added, omitted or combined. In addition, features described with reference to some examples may be combined in other examples.

According to the descriptions in the foregoing implementations, those skilled in the art may clearly learn that the method according to the foregoing embodiment may be implemented by relying on software and a necessary common hardware platform or certainly by using hardware, but the former implementation is better in many cases. Based on such an understanding, the technical solutions of this application essentially, or the part contributing to the prior art, may be presented in the form of a software product. The computer software product is stored in a storage medium (for example, an ROM/RAM, a magnetic disk, or an optical disc) including several instructions to enable a terminal device (which may be a mobile phone, a computer, a server, an air-conditioner, a network device, or the like) to perform the methods described in the various embodiments of this application.

The embodiments of this application have been described above with reference to the accompanying drawings. This application is not limited to the specific implementations described above, and the specific implementations described above are merely exemplary and not limitative. Those ordinarily skilled in the art may make various forms under the revelation of this application without departing from the intention of this application and the protection scope of the claims, which shall all fall within the protection of this application.

The invention claimed is:

1. A photographing method, comprising:
receiving a first input performed by a user, the first input being used for adjusting a display state of a first object in a first preview image, and the first preview image being an image captured by a first camera;
displaying a second preview image in response to the first input, the second preview image being obtained by processing an image captured by a main camera, and the second preview image comprising the first object whose display state has changed; and
performing, according to display information of the second preview image, image processing on N images captured by N cameras to obtain a first target image;
the N cameras at least comprising the main camera, and N being a positive integer;
wherein before receiving the first input performed by the user, the method further comprises:
receiving a fourth input on the first object in the first preview image performed by a user; and
displaying a first display state adjusting control associated with the first object in the first preview image in response to the fourth input; and
receiving the first input performed by the user comprises:
receiving a first input on the first display state adjusting control performed by the user;
different objects in the first preview image being associated with different display state adjusting controls;
wherein receiving the first input on the first display state adjusting control performed by the user comprises:
in a case that the first display state adjusting control comprises a first sub-control and a second sub-control, receiving a first input on the first sub-control or the second sub-control performed by the user, the first sub-control being used for adjusting a display size of one object, and the second sub-control being used for adjusting a display position of one object; and
in a case that the first display state adjusting control comprises a first display mode and a second display mode, receiving a first input on the first display state adjusting control in the first display mode or the first display state adjusting control in the second display mode performed by the user, the first display state adjusting control in the first display mode being used for adjusting the display size of one object; the first display state adjusting control in the second display mode being used for adjusting the display position of one object.

2. The method according to claim 1, wherein in a case that the first camera is the main camera, the N cameras comprise the main camera;
in a case that the first camera is a first auxiliary camera, the N cameras comprise the main camera and the first auxiliary camera, and a focusing range of the first auxiliary camera is different from a focusing range of the main camera; and
the display information comprises at least one of the following: a display effect, a display size or a display position.

3. The method according to claim 1, wherein after displaying the second preview image in response to the first input, the method further comprises:
   receiving a second input of the user, the second input being used for selecting a second object of the second preview image;
   displaying a third preview image in response to the second input, the third preview image being an image captured by a second camera;
   receiving a third input of the user, the third input being used for adjusting a display state of the second object in the third preview image;
   displaying a fourth preview image in response to the third input, the fourth preview image being obtained by processing the image captured by the main camera, and the fourth preview image comprising the first object whose display state has changed and the second object whose display state has changed; and
   performing image processing on the N images captured by the N cameras according to display information of the fourth preview image to obtain a second target image.

4. The method according to claim 3, wherein in a case that the first camera is a first auxiliary camera, the second camera is a second auxiliary camera, and focusing ranges of the first auxiliary camera, the second auxiliary camera and the main camera are different, the N cameras comprise the main camera, the first auxiliary camera and the second auxiliary camera; and
   processing, according to the display information of the fourth preview image, the N images captured by the N cameras to obtain the target image comprises:
   obtaining a first image, a second image and a third image, the first image being an image captured by the main camera at a first moment, the second image being an image captured by the first auxiliary camera at the first moment, and the third image being an image captured by the second auxiliary camera at the first moment;
   performing first image processing on the first image to obtain the first intermediate image, the first intermediate image comprising all pixel information in the first image except for first pixel information, and the first pixel information being pixel information corresponding to the first object and the second object in the first image;
   performing second image processing on the second image to obtain the second intermediate image, the second intermediate image only comprising second pixel information in the second image, and the second pixel information being pixel information corresponding to the first object in the second image;
   performing third image processing on the third image to obtain the third intermediate image, the third intermediate image only comprising third pixel information in the second image, and the third pixel information being pixel information corresponding to the second object in the third image; and
   compositing the first intermediate image, the second intermediate image and the third intermediate image according to the display information in the fourth preview image to obtain the second target image;
   the first moment being a moment earlier than an input moment of the photographing input, or the first moment being a moment later than the input moment of the photographing input.

5. The method according to claim 1, wherein in a case that the first camera and the main camera are not the same camera, before receiving the first input of the user, the method further comprises:
   displaying a fifth preview image, the fifth preview image being an image captured by a main camera;
   receiving a fifth input on a first object of the fifth preview image performed by a user;
   obtaining a first object distance corresponding to the first object in response to the fifth input;
   determining a target camera matching the first object according to the first object distance; and
   displaying the first preview image in a case that the target camera is the first camera.

6. An electronic device, comprising a processor and a memory storing a program or an instruction that is capable of running on the processor, wherein the program or the instruction, when executed by the processor, causes the electronic device to perform:
   receiving a first input performed by a user, the first input being used for adjusting a display state of a first object in a first preview image, and the first preview image being an image captured by a first camera;
   displaying a second preview image in response to the first input, the second preview image being obtained by processing an image captured by a main camera, and the second preview image comprising the first object whose display state has changed; and
   performing, according to display information of the second preview image, image processing on N images captured by N cameras to obtain a first target image;
   the N cameras at least comprising the main camera, and N being a positive integer;
   wherein before receiving the first input performed by the user, the program or the instruction, when executed by the processor, causes the electronic device to further perform:
   receiving a fourth input on the first object in the first preview image performed by a user; and
   displaying a first display state adjusting control associated with the first object in the first preview image in response to the fourth input; and
   when receiving the first input performed by the user, the program or the instruction is executed by the processor to cause the electronic device to further perform:
   receiving a first input on the first display state adjusting control performed by the user;
   different objects in the first preview image being associated with different display state adjusting controls;
   wherein when receiving the first input on the first display state adjusting control performed by the user, the program or the instruction is executed by the processor to cause the electronic device to further perform:
   in a case that the first display state adjusting control comprises a first sub-control and a second sub-control, receiving a first input on the first sub-control or the second sub-control performed by the user, the first sub-control being used for adjusting a display size of one object, and the second sub-control being used for adjusting a display position of one object; and
   in a case that the first display state adjusting control comprises a first display mode and a second display mode, receiving a first input on the first display state adjusting control in the first display mode or the first display state adjusting control in the second display mode performed by the user, the first display state adjusting control in the first display mode being used for adjusting the display size of one object; the first display state adjusting control in the second display mode being used for adjusting the display position of one object.

7. The electronic device according to claim 6, wherein in a case that the first camera is the main camera, the N cameras comprise the main camera;
in a case that the first camera is a first auxiliary camera, the N cameras comprise the main camera and the first auxiliary camera, and a focusing range of the first auxiliary camera is different from a focusing range of the main camera; and
the display information comprises at least one of the following: a display effect, a display size or a display position.

8. The electronic device according to claim 6, wherein after displaying the second preview image in response to the first input, the program or the instruction, when executed by the processor, causes the electronic device to further perform:
receiving a second input of the user, the second input being used for selecting a second object of the second preview image;
displaying a third preview image in response to the second input, the third preview image being an image captured by a second camera;
receiving a third input of the user, the third input being used for adjusting a display state of the second object in the third preview image;
displaying a fourth preview image in response to the third input, the fourth preview image being obtained by processing the image captured by the main camera, and the fourth preview image comprising the first object whose display state has changed and the second object whose display state has changed; and
performing image processing on the N images captured by the N cameras according to display information of the fourth preview image to obtain a second target image.

9. The electronic device according to claim 8, wherein in a case that the first camera is a first auxiliary camera, the second camera is a second auxiliary camera, and focusing ranges of the first auxiliary camera, the second auxiliary camera and the main camera are different, the N cameras comprise the main camera, the first auxiliary camera and the second auxiliary camera; and
when processing, according to the display information of the fourth preview image, the N images captured by the N cameras to obtain the target image, the program or the instruction is executed by the processor to cause the electronic device to further perform:
obtaining a first image, a second image and a third image, the first image being an image captured by the main camera at a first moment, the second image being an image captured by the first auxiliary camera at the first moment, and the third image being an image captured by the second auxiliary camera at the first moment;
performing first image processing on the first image to obtain the first intermediate image, the first intermediate image comprising all pixel information in the first image except for first pixel information, and the first pixel information being pixel information corresponding to the first object and the second object in the first image;
performing second image processing on the second image to obtain the second intermediate image, the second intermediate image only comprising second pixel information in the second image, and the second pixel information being pixel information corresponding to the first object in the second image;
performing third image processing on the third image to obtain the third intermediate image, the third intermediate image only comprising third pixel information in the second image, and the third pixel information being pixel information corresponding to the second object in the third image; and
compositing the first intermediate image, the second intermediate image and the third intermediate image according to the display information in the fourth preview image to obtain the second target image;
the first moment being a moment earlier than an input moment of the photographing input, or the first moment being a moment later than the input moment of the photographing input.

10. The electronic device according to claim 6, wherein in a case that the first camera and the main camera are not the same camera, before receiving the first input of the user, the program or the instruction, when executed by the processor, causes the electronic device to further perform:
displaying a fifth preview image, the fifth preview image being an image captured by a main camera;
receiving a fifth input on a first object of the fifth preview image performed by a user;
obtaining a first object distance corresponding to the first object in response to the fifth input;
determining a target camera matching the first object according to the first object distance; and
displaying the first preview image in a case that the target camera is the first camera.

11. A non-transitory readable storage medium storing a program or an instruction, wherein the program or the instruction, when executed by a processor, causes the processor to perform:
receiving a first input performed by a user, the first input being used for adjusting a display state of a first object in a first preview image, and the first preview image being an image captured by a first camera;
displaying a second preview image in response to the first input, the second preview image being obtained by processing an image captured by a main camera, and the second preview image comprising the first object whose display state has changed; and
performing, according to display information of the second preview image, image processing on N images captured by N cameras to obtain a first target image;
the N cameras at least comprising the main camera, and N being a positive integer;
wherein before receiving the first input performed by the user, the program or the instruction, when executed by the processor, causes the processor to further perform:
receiving a fourth input on the first object in the first preview image performed by a user; and
displaying a first display state adjusting control associated with the first object in the first preview image in response to the fourth input; and
when receiving the first input performed by the user, the program or the instruction is executed by the processor to cause the processor to further perform:
receiving a first input on the first display state adjusting control performed by the user;
different objects in the first preview image being associated with different display state adjusting controls;
wherein when receiving the first input on the first display state adjusting control performed by the user, the program or the instruction is executed by the processor to cause the processor to further perform:
  in a case that the first display state adjusting control comprises a first sub-control and a second sub-control, receiving a first input on the first sub-control or the second sub-control performed by the user, the first sub-control being used for adjusting a display size of one object, and the second sub-control being used for adjusting a display position of one object; and
  in a case that the first display state adjusting control comprises a first display mode and a second display mode, receiving a first input on the first display state adjusting control in the first display mode or the first display state adjusting control in the second display mode performed by the user, the first display state adjusting control in the first display mode being used for adjusting the display size of one object; the first display state adjusting control in the second display mode being used for adjusting the display position of one object.

12. The non-transitory readable storage medium according to claim 11, wherein in a case that the first camera is the main camera, the N cameras comprise the main camera;
  in a case that the first camera is a first auxiliary camera, the N cameras comprise the main camera and the first auxiliary camera, and a focusing range of the first auxiliary camera is different from a focusing range of the main camera; and
  the display information comprises at least one of the following: a display effect, a display size or a display position.

13. The non-transitory readable storage medium according to claim 11, wherein after displaying the second preview image in response to the first input, the program or the instruction, when executed by the processor, causes the processor to further perform:
  receiving a second input of the user, the second input being used for selecting a second object of the second preview image;
  displaying a third preview image in response to the second input, the third preview image being an image captured by a second camera;
  receiving a third input of the user, the third input being used for adjusting a display state of the second object in the third preview image;
  displaying a fourth preview image in response to the third input, the fourth preview image being obtained by processing the image captured by the main camera, and the fourth preview image comprising the first object whose display state has changed and the second object whose display state has changed; and
  performing image processing on the N images captured by the N cameras according to display information of the fourth preview image to obtain a second target image.

14. The non-transitory readable storage medium according to claim 13, wherein in a case that the first camera is a first auxiliary camera, the second camera is a second auxiliary camera, and focusing ranges of the first auxiliary camera, the second auxiliary camera and the main camera are different, the N cameras comprise the main camera, the first auxiliary camera and the second auxiliary camera; and
  when processing, according to the display information of the fourth preview image, the N images captured by the N cameras to obtain the target image, the program or the instruction is executed by the processor to cause the processor to further perform:
  obtaining a first image, a second image and a third image, the first image being an image captured by the main camera at a first moment, the second image being an image captured by the first auxiliary camera at the first moment, and the third image being an image captured by the second auxiliary camera at the first moment;
  performing first image processing on the first image to obtain the first intermediate image, the first intermediate image comprising all pixel information in the first image except for first pixel information, and the first pixel information being pixel information corresponding to the first object and the second object in the first image;
  performing second image processing on the second image to obtain the second intermediate image, the second intermediate image only comprising second pixel information in the second image, and the second pixel information being pixel information corresponding to the first object in the second image;
  performing third image processing on the third image to obtain the third intermediate image, the third intermediate image only comprising third pixel information in the second image, and the third pixel information being pixel information corresponding to the second object in the third image; and
  compositing the first intermediate image, the second intermediate image and the third intermediate image according to the display information in the fourth preview image to obtain the second target image;
  the first moment being a moment earlier than an input moment of the photographing input, or the first moment being a moment later than the input moment of the photographing input.

* * * * *